(12) United States Patent  (10) Patent No.: US 8,029,065 B2
Wieczorek et al.  (45) Date of Patent: *Oct. 4, 2011

(54) SLIDING ARMREST

(75) Inventors: Joseph P. Wieczorek, Lake Orion, MI (US); Bryan Busha, Grand Blanc, MI (US); Donald J. Woodward, Shelby Township, MI (US); Leslie R. Hinds, Oxford, MI (US); Marius Cociuba, Dearborn, MI (US); Thomas Faber Morse, Milford, MI (US); Bharat Vennapusa, West Bloomfield, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/386,704

(22) Filed: Apr. 22, 2009

(65) Prior Publication Data

US 2009/0206647 A1 Aug. 20, 2009

Related U.S. Application Data

(62) Division of application No. 11/287,413, filed on Nov. 23, 2005, now Pat. No. 7,537,287.

(51) Int. Cl.
*A47C 7/54* (2006.01)
(52) U.S. Cl. .................................................. 297/411.35
(58) Field of Classification Search ............. 297/411.37, 297/411.35; 248/298.1, 118, 299.1, 429
See application file for complete search history.

(56) References Cited

U.S. PATENT DOCUMENTS

| 4,660,881 | A | | 4/1987 | Komeya et al. |
| 4,685,729 | A | | 8/1987 | Heesch et al. |
| 4,934,750 | A | | 6/1990 | Eichler et al. |
| 5,443,301 | A | | 8/1995 | Lai |
| 5,649,741 | A | * | 7/1997 | Beggs ............................. 297/353 |
| 5,732,994 | A | | 3/1998 | Stancu et al. |
| 5,845,965 | A | | 12/1998 | Heath et al. |
| 6,007,155 | A | | 12/1999 | Hara et al. |
| 6,010,193 | A | | 1/2000 | Hara et al. |
| 6,045,173 | A | | 4/2000 | Tiesler et al. |
| 6,250,729 | B1 | | 6/2001 | Allison et al. |
| 6,419,314 | B1 | | 7/2002 | Scheerhorn |
| 6,719,637 | B1 | | 4/2004 | Greene |
| 7,077,468 | B2 | | 7/2006 | Maierholzner |
| 2004/0080173 | A1 | * | 4/2004 | Niwa et al. .................. 296/24.34 |
| 2005/0189807 | A1 | | 9/2005 | Norman et al. |
| 2005/0225148 | A1 | * | 10/2005 | Jones et al. ............... 297/411.35 |
| 2006/0279123 | A1 | * | 12/2006 | Bazinski et al. ......... 297/411.35 |

* cited by examiner

*Primary Examiner* — Milton Nelson, Jr.
(74) *Attorney, Agent, or Firm* — Raggio & Dinnin, P.C.

(57) ABSTRACT

A sliding armrest for use in an automotive vehicle. The sliding armrest including a lower cover, and a lower rail case arranged on a top surface of the lower cover. The armrest includes a guide arranged on the surface of the lower rail case and an upper case cover having a plurality of bosses extending from the surface thereof with the bosses contacting the guide. The sliding armrest also includes a force member arranged between the upper case cover and the guide.

7 Claims, 4 Drawing Sheets

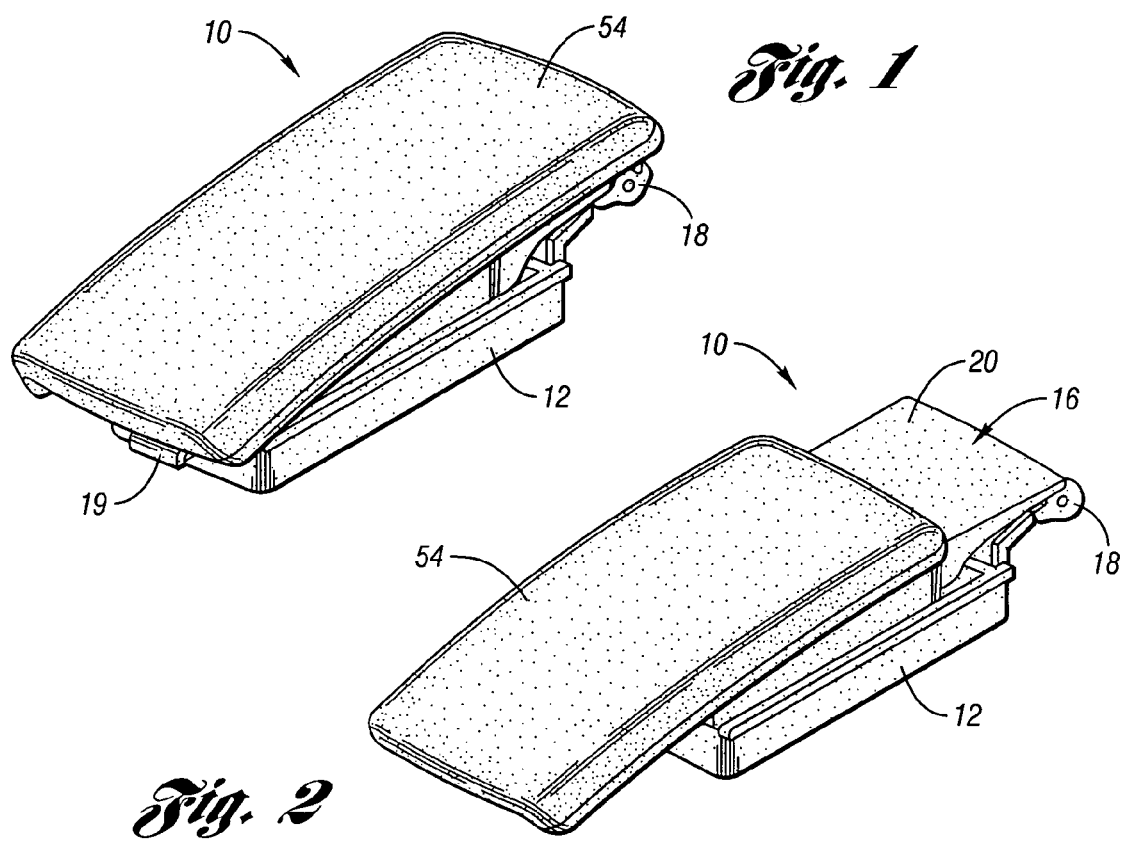
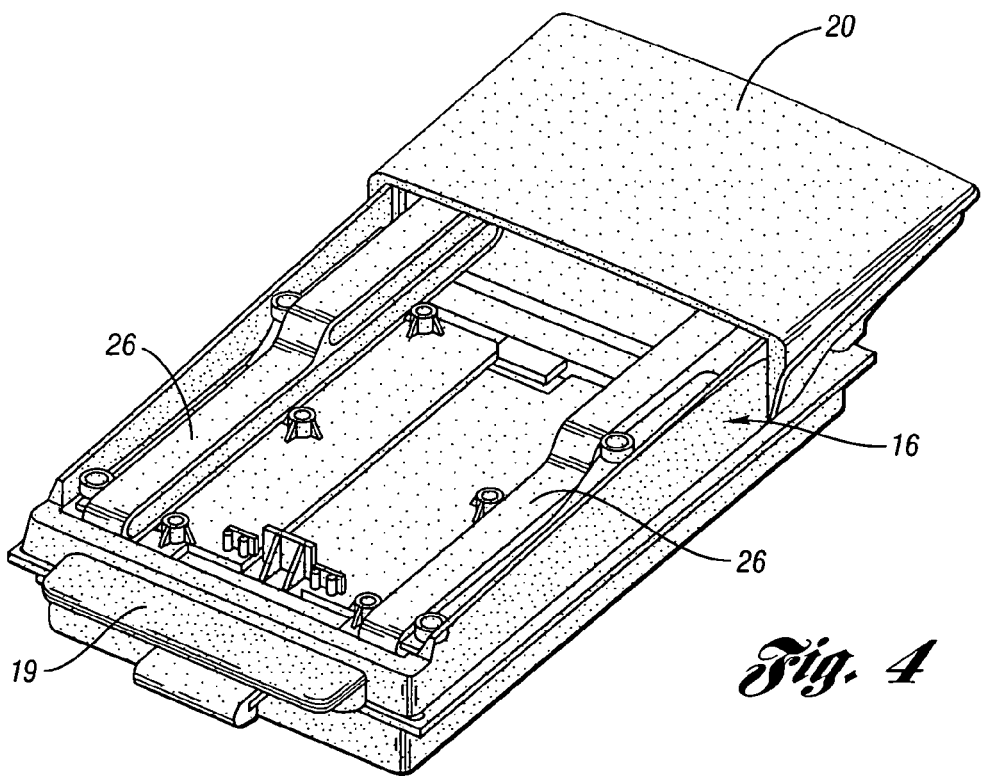

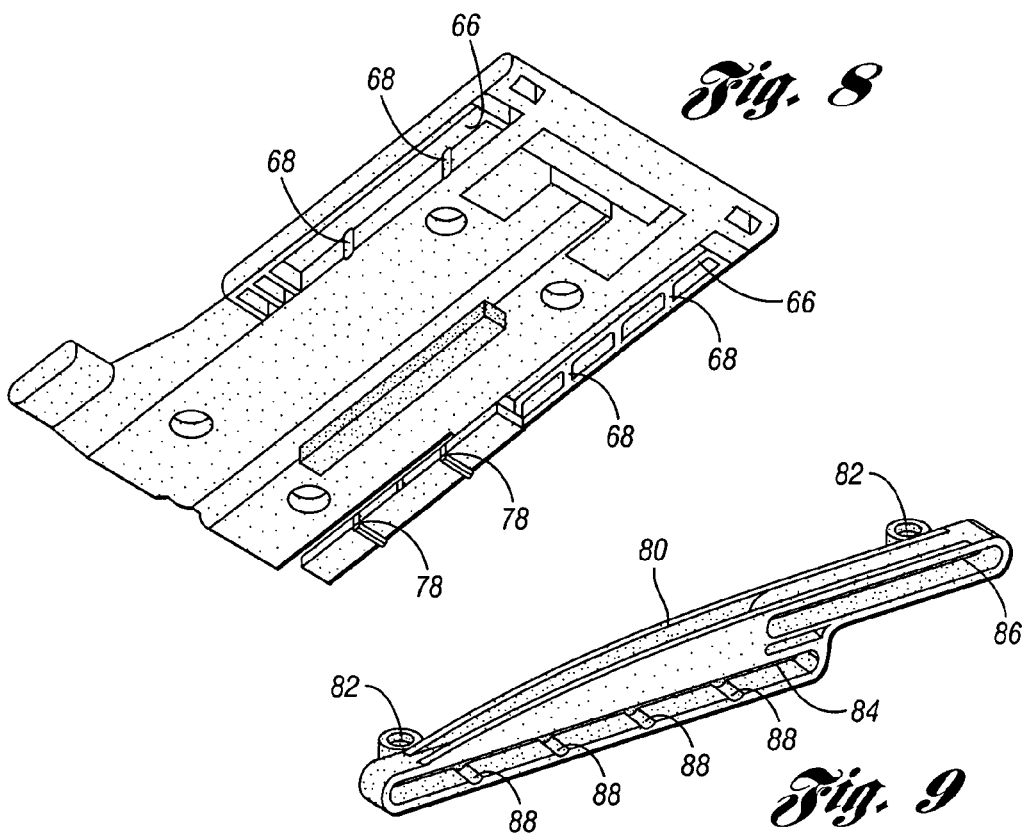
Fig. 8
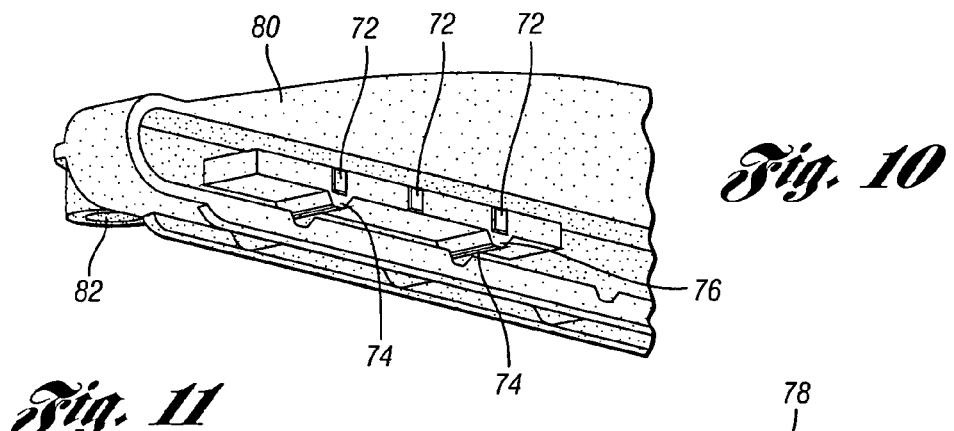
Fig. 9
Fig. 10
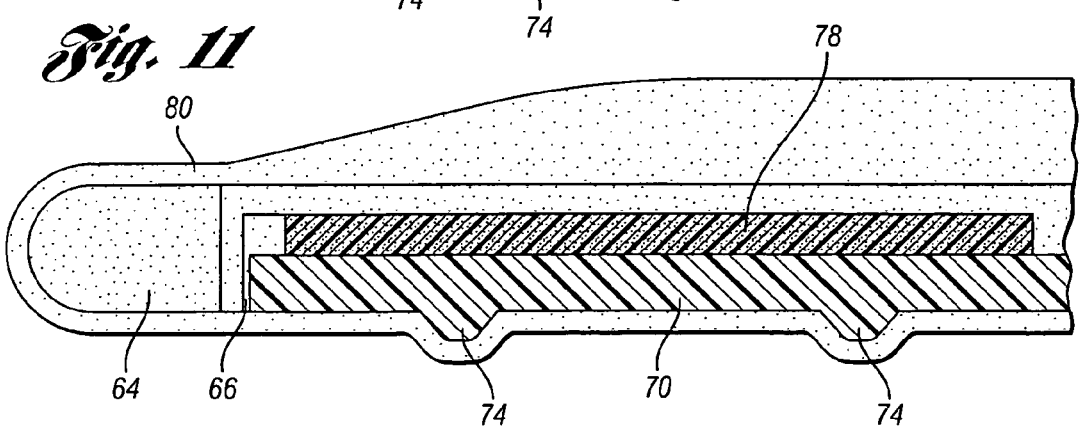
Fig. 11

SLIDING ARMREST

This is a divisional of application Ser. No. 11/287,413 Filed Nov. 23, 2005, now U.S. Pat. No. 7,537,287.

TECHNICAL FIELD

The present invention relates to a sliding armrest cover for a center console for vehicles, particularly to center consoles having a cover pivotally attached to a base to uncover a storage area within the console.

BACKGROUND OF THE INVENTION

A number of vehicles currently available utilize separate seats in the front row. This allows the driver to adjust the driver's seat separately from the front row passenger seat and provides greater adjustability, convenience and comfort. The space between the front seats is typically utilized to provide a storage console and has become an expected feature in vehicles. To better utilize the console, the console has been provided with a padded cover and positioned to provide an armrest for the driver and/or the front seat passenger. Further or separate consoles may be provided in rear bench seats, where the console has a stowed position flush within the seatback of the bench seat, and a lowered position where it divides the bench seat and acts as an armrest.

There have been prior attempts to improve the utility of a center console as an armrest, providing the console with a lid or cover which slides or reciprocates forward and back to adjust to the comfort of the driver or passenger. However, providing a console lid with a sliding surface has posed several problems which have not been completely solved in the art. Examples of various attempts in the art to provide a sliding console include U.S. Pat. Nos. 4,685,729; 4,934,750; 5,732,944; 5,845,965; 6,007,155; 6,010,193; 6,045,173; 6,250,729; 6,419,314; 6,719,367 and 6,789,831.

There remains a need in the art to provide a sliding armrest surface for a console which is robust enough to support substantial downward and lateral forces throughout its range of travel. In particular, the motion of the sliding cover must be controlled so that the armrest does not slide freely in an accident or during sudden braking of when inadvertently bumped or moved. However, the motion of the armrest must be freely activated by a driver with one hand without distracting the driver's attention. Thus, it is important to have a smooth and consistent sliding motion throughout the range of travel and yet control unwanted travel. In particular, it is desirable to more resist or dampen sudden motion of the armrest, while providing less resistance to controlled steady motion of the armrest. Further, it is preferred to have a plurality of rest positions along the length of travel in which the armrest is biased into a rest position and resists motion.

SUMMARY OF THE INVENTION

The present invention provides an assembly which may be assembled at relatively low cost and yet provides a comfortable armrest for a console which is ergonomically functional and comfortable, and is structurally robust throughout its range of motion. Further, the motion of the armrest is controlled along its length of travel. The invention may provide discreet rest positions in which the armrest is further biased to resist motion. Still further, the invention may further include a viscous dampener to provide additional motion control.

BRIEF DESCRIPTION OF THE DRAWINGS

FIG. 1 is a front left perspective view of a first embodiment of the present invention in its stowed position.

FIG. 2 is a front left perspective view of the embodiment shown in FIG. 1, but in the deployed position.

FIG. 4 is a front left perspective view of a partial assembly of the lower cover, lower rail case and guides of the embodiment of FIGS. 1-3.

FIG. 8 is a bottom view of the slide member of the alternate embodiment.

FIG. 9 is a side view of a guide rail of the alternate embodiment.

FIG. 10 is a side view of a guide rail having a slide plate arranged therein.

FIG. 11 is a partial cross sectional view of the alternate embodiment of the present invention.

DETAILED DESCRIPTION OF THE INVENTION

Figure 3:
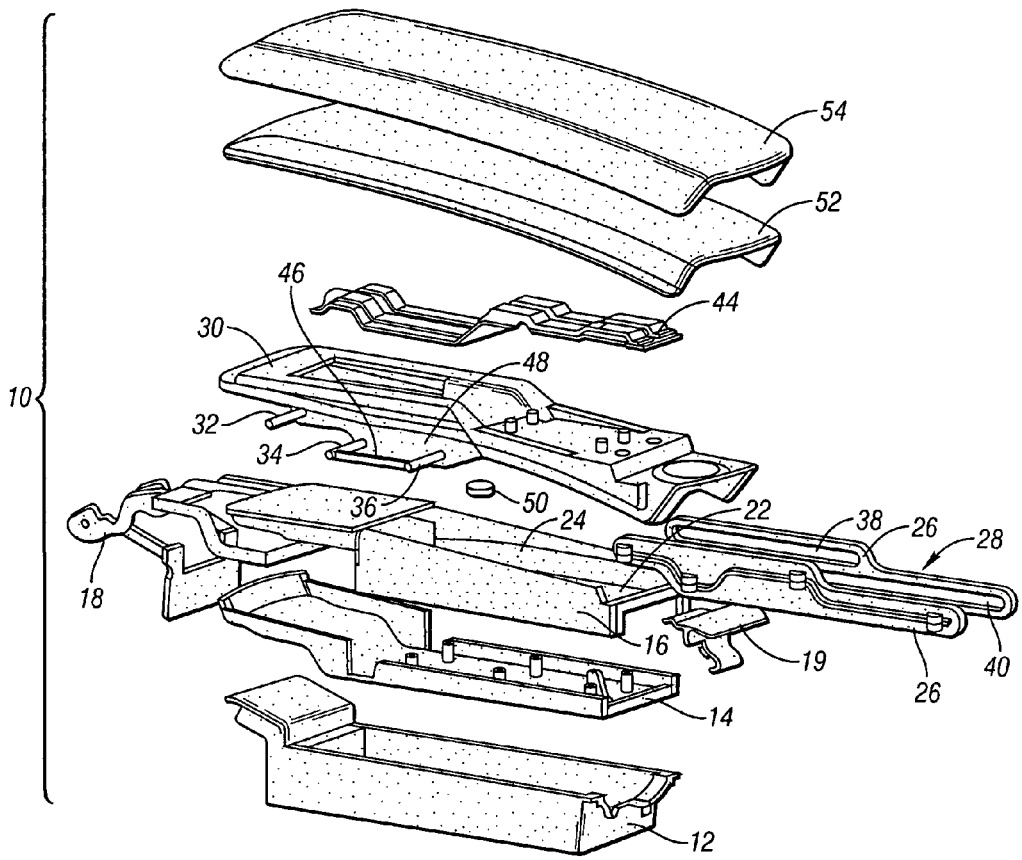
FIG. 3 is an exploded perspective view from the right side of the embodiment of FIGS. 1 and 2.
Figure 5:
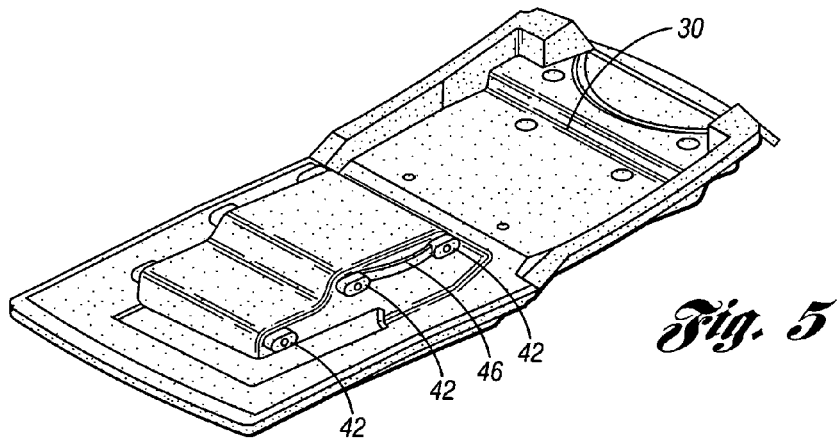
FIG. 5 is a lower left rear perspective view of the upper case cover of the embodiment of FIGS. 1-3.
Figure 6:
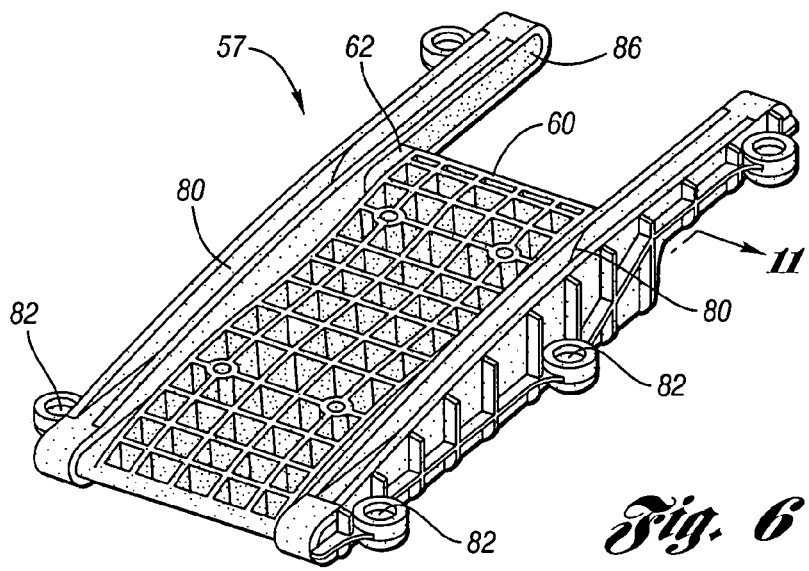
FIG. 6 is a perspective view of an alternate embodiment of the slider mechanism of the present invention.
Figure 7:
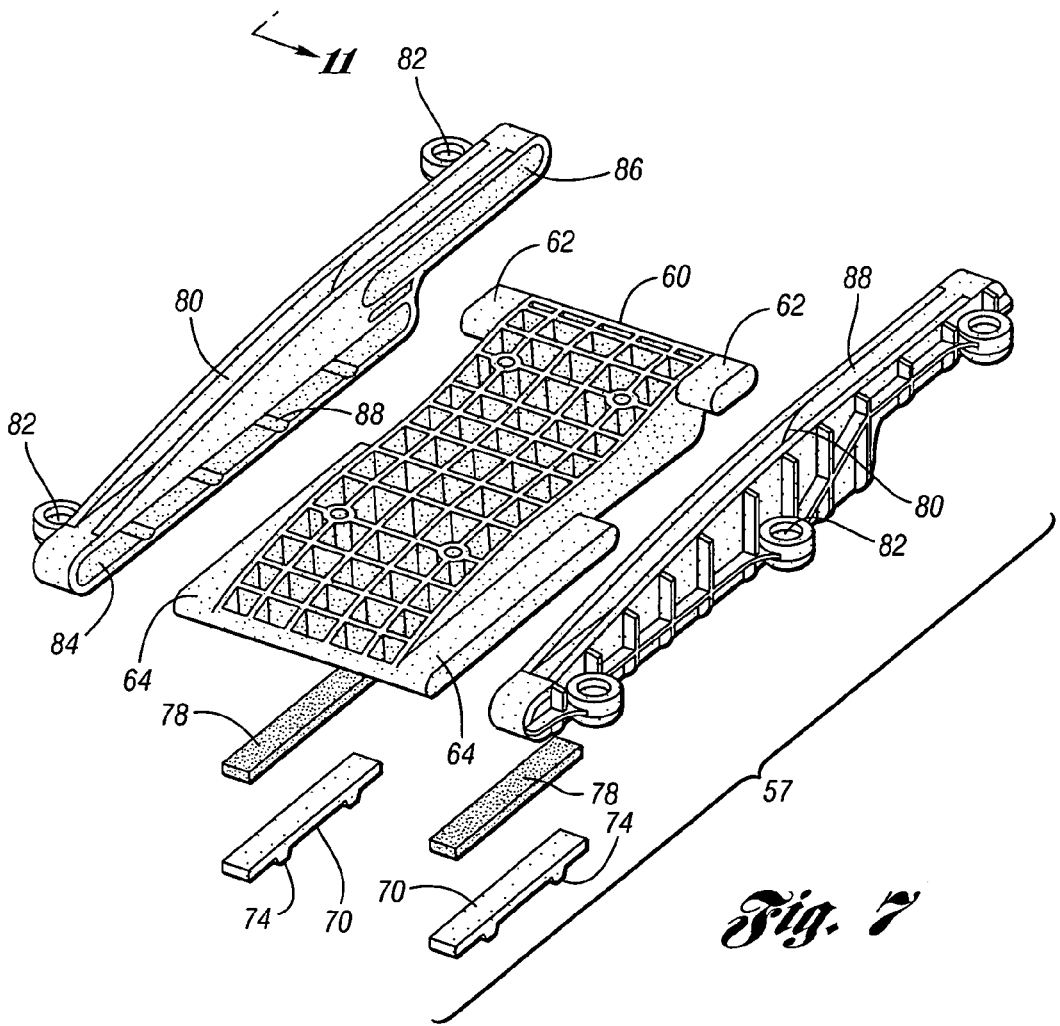
FIG. 7 is an exploded view of the alternate embodiment of the slider mechanism of FIG. 6.

One embodiment of the present invention is shown in FIGS. 1-5. A center console 10 includes a bin 12 having a lower cover 14 fastened within a lower rail case 16 connected to the bin 12 by a steel hinge 18. The hinge 18 is preferably located at the rearward end of the bin so that the cover 14 opens from the front and pivots back toward the seat back; however it should be appreciated that the present invention can be utilized with other hinge orientations. The hinge 18 is preferably pivotally mounted to a seat such as an automotive passenger seat, and more specifically between the front seats of an automotive vehicle. Thus the console 10 can be pivoted between an upright position beside or between seat backs which provides more room in the hip area of an occupant of the seat, and a horizontal position to allow use of the console as an armrest and to allow access to the bin for storage. The bin may be configured in a number of ways to provide a variety of storage functions, such as ribs for separating and supporting compact disk cases, devices for receiving and holding coins, and countless other devices. In particular, the bin may receive a fold-out or otherwise deployed cup holder device. The lower rail case 16 and lower cover 14 are secured at their other end to the bin 12 by a latch 19. There are multiple latch mechanisms which may be utilized, preferably one of the variety of latches available which are position-sensitive such that the lower cover 14 cannot be opened relative to the bin 12 when the console 10 is pivoted into its upright position, thus preventing the unintentional opening of the cover, allowing the contents of the bin 12 to spill.

In order to provide a sliding armrest on the embodiment shown, the lower rail case 16 is provided with a horizontal panel 20 and an open portion 22 having walls 24. Between the walls 24 are disposed a pair of guides 26 each defining a guide track 28. Held within the guide rails 26 is the upper case cover 30. The upper cover 30 is supported within the guide rails 26 by a plurality of steel tubes 32, 34, 36, which provide the structural strength required of a passenger compartment component throughout the range of motion of the armrest, although it should be appreciated that more or less tubes could be used depending on the size of the armrest and the length and path of deployment. As seen in FIG. 3, the guide track on each of the guides 26 have two distinct segments 38 and 40, corresponding to the individual steel tubes 32 and 34 of the upper cover 30. The tubes may be provided with polymeric bosses 42 to facilitate sliding engagement. The upper cover 30 is provided with a reinforcement bracket 44, to provide structural strength to the armrest in the deployed position, where the armrest is cantilevered out past the lower cover 14 and bin 12.

An alternate embodiment (not shown) may utilize a different slide mechanism, akin to a dovetail shaped tongue-and-groove assembly, the upper case cover 30 having a shaped elongated rail which rides within a single shaped guide or groove within the rail case. In such an embodiment, the lower cover 14 and lower rail case 16 may be combined into a single component, and the upper case cover and lid may also be combined into a single component. Further, the rail or shaped protrusion may be formed in the lower cover assembly, and the shaped guide may be formed in the upper cover assembly, such that the armrest assembly can be snap fit together by spreading the downwardly extending portions of the upper cover over the rails of the lower assembly and pressing the guides onto the rails.

Motion of the armrest may be restrained in additional ways as illustrated in FIG. 3. A leaf spring 46 is provided on each of downwardly depending walls 48 of the upper cover 30, which ride within the lower guide track, exerting a lateral frictional force on the guide track, restraining the motion of the armrest. It should be noted that the force can be applied in any direction. Further, the opposing leaf springs 46 tend to center the upper cover 30 as it moves with respect to the rail case 16, providing a more consistent motion. Additional dampening force is provided by a viscous dampening device 50, which is a device known in furniture drawer art; see for example U.S. Pat. No. 4,660,881. The viscous dampener 50 is located such that sliding motion of the armrest causes rotation of a member within viscous fluid within the dampener 50. The more quickly the disk rotates, the more the viscous fluid resists the rotation. Thus, the dampener 50 will most resist movements of the armrest which are sudden or violent and less likely to be intentional and more likely to be dangerous or destructive.

Alternate embodiments (not shown) would include providing the lower guide track with recesses or detents, and providing the leaf spring 46 with a protrusion for engaging said detents, or substituting the said spring 46 an arm biased outwardly to engage the detents. Thus, the upper cover is biased into predetermined positions, resisting movement and thus not floating or easily jogged from its position. However, a relatively slight but firm force from an occupant will dislodge the spring or arm from the detent and will cause the arm rest to move in the desired direction.

The lid 52 is fastened to the upper cover 30, and is preferably provided with a foam covering 54 for comfort. The lid 52, upper cover, lower cover and lower rail case are preferably molded from ABS, and the latch and guide are preferably molded from acetyl, while the bin is preferably molded from polypropylene, although other plastics, composites, plastics, metals or other material may be substituted as desired.

FIGS. 6-11 show an alternate embodiment of a sliding armrest according to the present invention. Generally, the alternate embodiment sliding armrest will operate and share many components with the embodiment described above. Except for generally the upper case cover, guides, and force member having changed as described hereafter. The alternate embodiment shown in FIGS. 6-11 will generally be used on a center console 10 that includes a bin 12 having a lower cover 14 which may be fastened within a lower rail case 16 connected to the bin 12 by a hinge 18. The hinge 18 is preferably located at the rearward end of the bin 12 so that the cover opens from the front and pivots back toward a seat. However, it should be appreciated that the present invention can be utilized with other hinge orientations including hinge orientations that open either toward the passenger seat or the driver seat. The lower portion of the alternate embodiment sliding armrest operates the same as that described above.

An alternate slider member 60 is arranged within the lower rail case 16 and/or lower cover 14 of the sliding armrest. A reinforcement bracket made of any high-strength material such as a metal, a high strength plastic or composite may be attached to the upper portion of the slider member 60 in the same embodiment. A lid is attached to the top of the reinforcement bracket or upper surface of the slider member 60 followed by a foam layer on which an arm will be resting during operation of the automotive vehicle either in the retracted position or fully extended forward position for the sliding armrest. It should be noted that any other type of material can be used for the top portion but a foam material is preferred to be used in the sliding armrest. Furthermore, many of the parts are made of an ABS plastic material, however any other type of plastic, ceramic, metal, or composite may be used depending on the weight requirements and design requirements for the sliding armrest.

The slider member 60 is generally made of a plastic material and in a preferred embodiment an ABS plastic. However, it should be noted that any other type of plastic, ceramic, fabric, composite, or metal may also be used to form the slider member 60. The slider member 60 will include a plurality of bosses 62, 64 extending from a side surface thereof. There will be two bosses 62, 64 located on each side of the slider member 60. The bosses 62, 64 generally have an oval shape or may be any another shape depending on the design requirements and opposing tracks through which the boss members 62, 64 are slidingly engageable. One of the bosses 64 on each side of the slider member 60 will include a pocket 66 that is generally in the form of a rectangular shape. However, it should be noted that the pocket 66 may be formed to any known shape depending on the design requirements and strength needed for the sliding armrest. The pocket 66 will have a predetermined depth and will include a plurality of grooves 68 arranged on the inner walls thereof. The grooves 68 will extend a predetermined distance into the slider pocket 66. The pocket 66 will generally open from the bottom of the bosses 64 near the bottom surface of the slider member 60. In the embodiment shown the slide member 60 includes the first and second bosses 64 with the pockets 66 arranged therein and a third and fourth boss 62 one arranged on each side respectively. The third and fourth bosses 62 are arranged on a similar plane which is above that of the plane of the first and second bosses 64. This vertical separation of bosses 62, 64 will allow for a more robust sliding armrest and slider mechanism which will reduce torque moments and like forces during operation of the sliding armrest.

A slide plate 70 generally having a rectangular shape is arranged within the pockets 66 of the first and second bosses 64. The slider plate 70 is generally made of a plastic material and preferably a PTFE Teflon acetal material. However, it should be noted that any other type of plastic, fabric, ceramic, metal, composite or the like may also be used for the slide plate 70 according to the present invention. The slide plate 70 will have a plurality of ribs 72 extending from both side surfaces thereof. The plurality of ribs 72 will mate with and engage with the plurality of grooves 68 located on the inside surface of the pockets 66 of the slide member 60. The ribs 72 will extend from the side surface a predetermined distance that will substantially equal that of the predetermined indentation of the groove 68 on the inside surface of the pockets 66 of the slide member 60. This will align the slide plate 70 within the pocket 66 and will align the slide plate 70 with respect to the slide member 60. At least one leg or protruding member extends from a surface of the slide plate 70 and in the embodiment shown two legs 74 extend from the bottom surface of the slide plate 70. In the embodiment shown the leg 74 generally has a triangular cross section. However, any other shaped leg 74 may be used depending on the design requirements of the sliding armrest. The leg 74 may also have a notch 76 on an inside surface of each of the legs 74.

A force member 78 having the form in one embodiment of a rectangular foam member, is arranged within the pocket 66 of the first and second bosses 64 and is sandwiched between a surface of the pocket 66 of the boss 64 and a surface of the slide plate 70. The foam 78 will act as a compressed spring between the slider pocket 66 and the slide plate 70. In the embodiment described a closed cell urethane foam is the preferred material. However it should be noted that any other type of fabric, plastic, composite, rubber, or the like may be used as the force member or spring component 78 within the present invention. In the embodiment shown the foam 78 will be compressed a predetermined amount in the slide position to obtain a normal force at the slide plate 70 contact points with that of a guide 80. The normal force in addition with the coefficient of friction between the slide plate 70 and the rearward track of the guide 80 will yield a lid sliding force of a predetermined force. In one embodiment contemplated approximately 12.5 N will be the sliding force. The foam 78 is also compressed a predetermined distance in a detent position with a normal force applied thereto. It should be noted that in the embodiment shown there are three detent positions with a total distance traveled being a predetermined number of millimeters or the like. In one embodiment contemplated a total travel distance will be that of approximately 75 millimeters. However, any other number of detent positions and any known distance of travel is also contemplated to be used for the present invention. It should be noted that the rectangular shape of the foam 78 is for one contemplated embodiment, as shown, however any other known shape may be used for the foam material depending on the design requirements and robustness needed for the sliding armrest.

The slider mechanism 57 according to the present invention will also include a first and second guide rail 80 which is preferably made of a plastic material and specifically an acetal. However, it should be noted that any other type of plastic, ceramic, fabric, metal, or composite may also be used for the guide rails 80. The guide rails 80 will include a plurality of orifices 82 used to connect the guide rails 80 to the lower portion of the sliding armrest. The guide rails 80 will include a first and second track 84, 86 located in each of the guide rails 80. The tracks 84, 86 will generally have an oval shape when viewed from the side. The second track 86 will be parallel to the first track 84 but located on a plane which is a predetermined distance above the first track 84. The second track 86 may also be offset from the first track 84. It should be noted that the tracks 81, 86 can be of any predetermined length, it can be of different lengths, or may even be of the same length depending on the design requirements and distance necessary to operate the sliding armrest. The first track 84 in the present embodiment will include a plurality of notches 88 on a bottom surface thereof. The notches 88 will be used to engage with and create detents with the legs 74 extending from the bottom surface of the slide plate 79. In the embodiment shown the slide plate 79 includes two legs 74 which will be secured in a detent position within two of the plurality of notches 88 located along the bottom surface of the first track 84. In the embodiment shown there are four notches 88 arranged along the bottom of the first track 84 and hence three detent positions for the sliding armrest. It should be noted that any number of notches 88 may be used thus allowing for any number of detent positions. The foam member 78 will create a predetermined sliding force for the sliding armrest during movement between detent positions and a predetermined force used to hold the sliding armrest in the detent position chosen by the operator of the armrest.

In operation, the slide member 60 will have the foam 78 inserted into each of the pockets 66 of the bosses 64 and then a slide plate 70 arranged within the pockets 66 such that the foam member 78 is sandwiched between a surface of the pocket 66 and a surface of the slide plate 76. The slide plate 70 will be held with relation to the guide rails 80 via the ribs 72 and grooves 68 located on the slide plate 70 and pockets 66 respectively. The slide plate 70 and boss component 64 will be arranged within the first track 84 of the guide rail 80 while the third and fourth bosses 62 will be arranged within the second track 86 of the guide rails 80. The foam 78 will create a force of predetermined strength between the slide member 60 and the guide rails 80. The force will create approximately 60 N of force between the slide plate 70 and guide rail 80 while in normal operation and when in the detent position a force of about 7 N will yield approximately 30 N of detent action during operation. This will ensure that the sliding armrest stays in a detent position chosen by the operator of the sliding armrest. It should be noted that any other amount or type of force can be designed for the sliding armrest and that the above approximation for the N force applied during normal operation and in the detent position are just one contemplated embodiment and that any other known force figures can be used for the sliding armrest according to the present invention. Hence, when the boss 64 having the slide plate 70 arranged therein is arranged within the first channel 84 of the guide rail 80 the top surface of the boss 64 will engage with a top surface of the channel or track 84 of the guide rail 80 while the bottom surface of the slide plate 70 and legs 74 extending therefrom will engage with a bottom portion of the first track 84 of the guide rails 80.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A sliding armrest, said armrest including:
   a lower cover;
   a lower rail case secured to a top surface of said lower cover, said rail case having a first and second wall, said walls are perpendicular to said top surface of said lower cover;
   a pair of guides disposed completely between and within said walls of said lower rail case;
   an upper case cover having a plurality of bosses extending from a surface thereof, said bosses contacting one of said guides; and
   a force member arranged between said upper case cover and one of said guides.

2. The armrest of claim 1 further including at least one tube, one of said bosses arranged on an end of said tube.

3. The armrest of claim 1 wherein said force member is a leaf spring, said leaf spring is connected to said upper case cover.

4. The armrest of claim 3 wherein said guide having at least one track therein, said bosses are slidingly engageable within said track.

5. The armrest of claim 4 wherein said leaf spring is arranged against a surface of said track to create a force against said track.

6. A slider assembly for use in an armrest, said assembly including:
- a slide member having a plurality of bosses extending from a surface thereof;
- a first and second guide, said guides having a first and second track arranged in each of said guides, at least one of said bosses slidingly arranged within each of said tracks of said guides;
- a force member arranged between said slide member and said guides, said force member is a spring, said spring arranged between two of said bosses, said spring contacts a surface of said tracks; and
- at least one tube that extends through said slide member and having one of said bosses arranged on each end thereof.

7. The assembly of claim 6 wherein said spring provides a lateral spring force between said slide member and said guides, said spring is in contact with two of said bosses.

* * * * *